United States Patent
Barbu et al.

(10) Patent No.: US 11,171,756 B2
(45) Date of Patent: Nov. 9, 2021

(54) ADAPTING GUARD BAND BETWEEN ADJACENT CHANNELS

(71) Applicant: Nokia Technologies Oy, Espoo (FI)

(72) Inventors: Oana-Elena Barbu, Aalborg (DK); Klaus Ingemann Pedersen, Aalborg (DK); Benny Vejlgaard, Gistrup (DK); Johannes Harrebek, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 110 days.

(21) Appl. No.: 16/818,349

(22) Filed: Mar. 13, 2020

(65) Prior Publication Data

US 2020/0313824 A1 Oct. 1, 2020

Related U.S. Application Data

(60) Provisional application No. 62/825,217, filed on Mar. 28, 2019.

(51) Int. Cl.
*H04L 5/00* (2006.01)
*H04L 5/14* (2006.01)
(Continued)

(52) U.S. Cl.
CPC ............ *H04L 5/0053* (2013.01); *H04L 5/001* (2013.01); *H04L 5/0048* (2013.01); *H04L 5/14* (2013.01);
(Continued)

(58) Field of Classification Search
CPC .... H04J 11/0023; H04L 5/001; H04L 5/0048; H04L 5/0053; H04L 5/14; H04W 72/0446; H04W 72/0453; H04W 72/082
(Continued)

(56) References Cited

U.S. PATENT DOCUMENTS

| | | |
|---|---|---|
| 7,949,343 B2 | 5/2011 | Kermoal et al. |
| 2007/0053418 A1 | 3/2007 | Goldburg |
| (Continued) | | |

OTHER PUBLICATIONS

Extended European Search Report received for corresponding European Patent Application No. 20162900.3, dated Jun. 25, 2020, 10 pages.
(Continued)

*Primary Examiner* — Robert J Lopata
(74) *Attorney, Agent, or Firm* — Nokia Technologies Oy

(57) ABSTRACT

There is provided a method in a network node, the method comprising: obtaining adjacent channel leakage ratio information on an uplink user equipment, UE, regarding first and second adjacent frequency bands, wherein the network node is configured to communicate in frequency-division duplexing mode with a plurality of UEs, comprising the uplink UE and a downlink UE, the first frequency band configured for uplink communication between the network node and the uplink UE and the second frequency band configured for downlink communication between the network node and the downlink UE; obtaining channel condition information regarding the downlink UE indicating channel condition associated with the first frequency band and channel condition associated with the second frequency band; adapting guard band between the first and second adjacent frequency bands based on the adjacent channel leakage ratio information and the channel condition information.

20 Claims, 8 Drawing Sheets

(51) Int. Cl.
*H04W 72/04* (2009.01)
*H04W 72/08* (2009.01)

(52) U.S. Cl.
CPC ... *H04W 72/0446* (2013.01); *H04W 72/0453* (2013.01); *H04W 72/082* (2013.01)

(58) Field of Classification Search
USPC .......................................................... 370/329
See application file for complete search history.

(56) References Cited

U.S. PATENT DOCUMENTS

| | | | |
|---|---|---|---|
| 2013/0107926 A1* | 5/2013 | Xia ........................... | H03F 3/24 375/224 |
| 2015/0326378 A1* | 11/2015 | Zhang .................. | H04W 76/14 370/280 |
| 2016/0095119 A1 | 3/2016 | Mizusawa | |
| 2016/0150483 A1* | 5/2016 | Kim ..................... | H04W 52/243 455/127.2 |
| 2017/0012654 A1* | 1/2017 | Lozhkin .................... | H03F 3/24 |
| 2018/0175949 A1* | 6/2018 | Rao ........................ | H04W 24/10 |
| 2018/0191482 A1* | 7/2018 | Zirwas ................. | H04B 7/2615 |
| 2019/0239198 A1* | 8/2019 | Zhang ................... | H04W 72/04 |
| 2020/0037269 A1* | 1/2020 | Ryu ........................ | H04B 7/063 |
| 2020/0067690 A1* | 2/2020 | Park .................... | H04W 52/243 |
| 2021/0045012 A1* | 2/2021 | Lee ..................... | H04W 28/085 |

OTHER PUBLICATIONS

"New WID on NR Uu Interface Enhancement", 3GPP TSG RAN Meeting #78, RP-172483, Agenda: 9.1.1, Huawei, Dec. 18-21, 2017, 5 pages.

"New SI Proposal: Study on Flexible and Full Duplex for NR", 3GPP TSG RAN Meeting #78, RP-172636, Agenda 9.1.1, LG Electronics, Dec. 18-21, 2017, 5 pages.

Mahmood et al., "Physical-Layer Security with Full-Duplex Transceivers and Multiuser Receiver at Eve", IEEE Transactions on Communications, vol. 65, No. 10, Oct. 2017, pp. 4392-4405.

Sarret et al., "Analyzing the Potential of Full Duplex in 5G Ultra-Dense Small Cell Networks", EURASIP Journal on Wireless Communications and Networking, Article No. 284, Dec. 13, 2016, pp. 1-16.

Sarret et al., "Can Full Duplex Reduce the Discovery Time in D2D Communication?", International Symposium on Wireless Communication Systems (ISWCS), Sep. 20-23, 2016, pp. 27-31.

"Evaluating Full Duplex Potential in Dense Small Cells from Channel Measurements", IEEE 83rd Vehicular Technology Conference (VTC Spring), May 15-18, 2016, 5 pages.

Sarret et al., "Impact of Transport Control Protocol on Full Duplex Performance in 5G Networks", IEEE 83rd Vehicular Technology Conference (VTC Spring), May 15-18, 2016, 5 pages.

Sarret et al., "Providing Fast Discovery in D2D Communication with Full Duplex Technology", International Workshop on Multiple Access Communications, 2016, pp. 98-108.

Mahmood et al., "On the Potential of Full Duplex Communication in 5G Small Cell Networks", IEEE 81st Vehicular Technology Conference (VTC Spring), May 11-14, 2015, 5 pages.

Mahmood et al., "Throughput Analysis of Full Duplex Communication with Asymmetric Traffic in Small Cell Systems", The Eleventh International Conference on Wireless and Mobile Communications, Oct. 2015, pp. 57-60.

"3rd Generation Partnership Project; Technical Specification Group Radio Access Network; NR; User Equipment (UE) radio transmission and reception; Part 1: Range 1 Standalone (Release 15)", 3GPP TS 38.101-1, V15.4.0, Dec. 2018, pp. 1-230.

WO PCT Application No. PCT/EP2019/057862, "Guard Time Adaptation in Wireless Communication Networks", filed on Mar. 28, 2019, pp. 1-25.

"3rd Generation Partnership Project; Technical Specification Group Radio Access Network; NR; Physical layer procedures for control (Release 15)", 3GPP TS 38.213, V15.4.0, Dec. 2018, pp. 1-104.

"3rd Generation Partnership Project; Technical Specification Group Radio Access Network; NR; Physical layer procedures for data (Release 15)", 3GPP TS 38.214, V15.4.0, Dec. 2018, pp. 1-102.

* cited by examiner

ADAPTING GUARD BAND BETWEEN ADJACENT CHANNELS

RELATED APPLICATION

This application claims priority from Provisional Patent Application No. 62/825,217 filed on Mar. 28, 2019, which is hereby incorporated in its entirety.

TECHNICAL FIELD

The invention relates to communications.

BACKGROUND

In a wireless network, guard bands can be utilized between adjacent channels to reduce unwanted adjacent channel interference caused by signal leakage between the channels. It may be beneficial to find new ways to enhance the use of guard bands so that scarce radio resources can be saved.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which.

DETAILED DESCRIPTION OF SOME EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
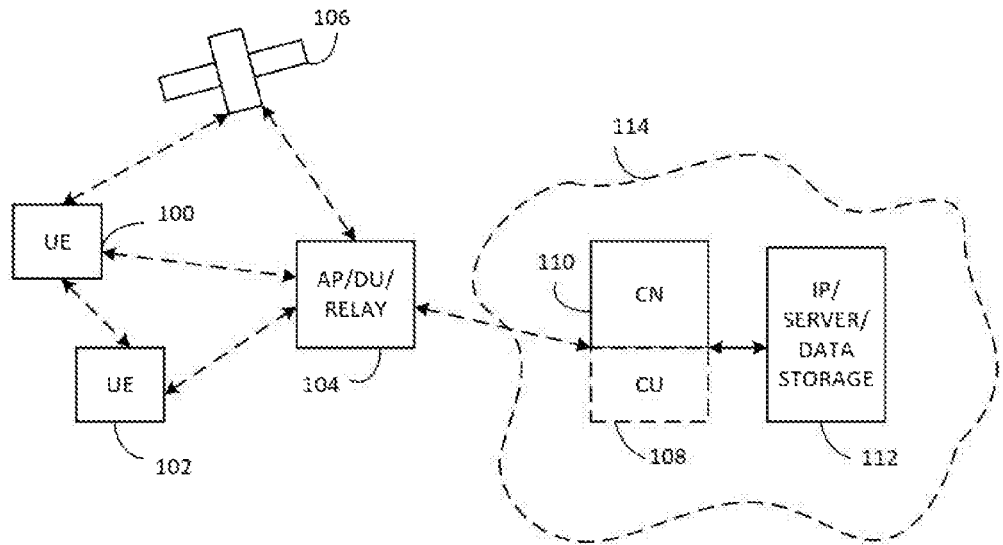
FIG. 1 illustrates an example a wireless communication system to which embodiments of the invention may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node 104 (such as (e/g)NodeB) providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage. The access node 104 may be referred to as network node or network element in a broader sense.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (e.g. in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

The current NR (or 5G) specifications support Frequency Division Duplex (FDD) and Time Division Duplex (TDD) duplexing modes. For FDD, non-overlapping carriers may be configured for the downlink and uplink transmissions, respectively. The duplexing distance (i.e. frequency separation between uplink and downlink carriers or frequency bands) is often dictated by the spectrum regulators, typically taking values of tens of megahertz (MHz). The duplexing distance, and corresponding UE and network node (referred to as gNB in some examples) radio frequency (RF) requirements may be such that adjacent channel interference (ACI) is tolerable without additional actions. For operation in unpaired bands, TDD mode may be defined. The TDD operation implies that a cell either have exclusive uplink, downlink, or no transmission for each time-instant. Hence, no option for simultaneous uplink and downlink transmission (as is the case for FDD) is supported in current NR specifications.

The NR radio frame structure may be rather flexible, allowing to have a series of different slot formats. The NR specifications may support 56 slot formats; ranging from slots with only downlink transmission, slots with only uplink transmission, and large number of slot formats with mixture of downlink, uplink, and flexible Orthogonal frequency-division multiplexing (OFDM) symbol configurations. In this context, a flexible OFDM symbol may be an arbitrary used for downlink, uplink, or muted. One of the major challenges with TDD is not having support for simultaneous uplink and downlink transmissions in cell. This is especially a challenge for Ultra-Reliable Low-Latency Communication (URLLC) and Time Sensitive Networking (TSN) use cases, where multiple simultaneously active UEs may need to be served immediately, and therefore often require a cell to have simultaneous uplink and downlink transmission to accommodate the strict latency/jitter and ultra-reliability requirements for all users. For these reasons, it may be beneficial to develop solutions to further enhance flexibility of the FDD mode in current and future networks.

For example, introduction of so-called flexible FDD mode for unpaired bands is expected, where a single unpaired carrier can be more efficiently utilized so some Physical Resource Blocks (PRBs) may be used for downlink transmission, while others may be used for uplink transmission. Such solutions may allow simultaneous downlink/uplink operation while still allowing to dynamically adjust the resources for the two link directions in line with the transmitted traffic. At this point it is noted that transmitted uplink and/or downlink traffic may be different types, wherein different data or traffic types may have different criticality and/or priority requirements. For example, voice traffic may have higher importance than Internet traffic or some other data service traffic.

However, flexible FDD mode for unpaired bands may come with a number of implications. First, it may require enhanced self-interference mitigation. At the network node side, the enhanced self-interference mitigation may be implemented as a hybrid of analog filtering and digital Self-interference cancellation (SIC) to cope with interference from downlink transmissions that leak to the resources where the network is at the same time receiving transmissions from UE(s). However, enhanced self-interference mitigation may come at the cost of increased complexity. Therefore, it may be beneficial to provide solutions that enable handling of the interference with less complex features. For example, lower complexity may be especially beneficial for implementation at the UEs, but may also be beneficial for the network nodes and the network as a whole. The network may refer to, for example, the network discussed with respect to FIG. 1 showing a wireless communication network, such as a cellular communication network. The cellular network may enable, for example, URLLC and/or TSN communication.

Figure 2:
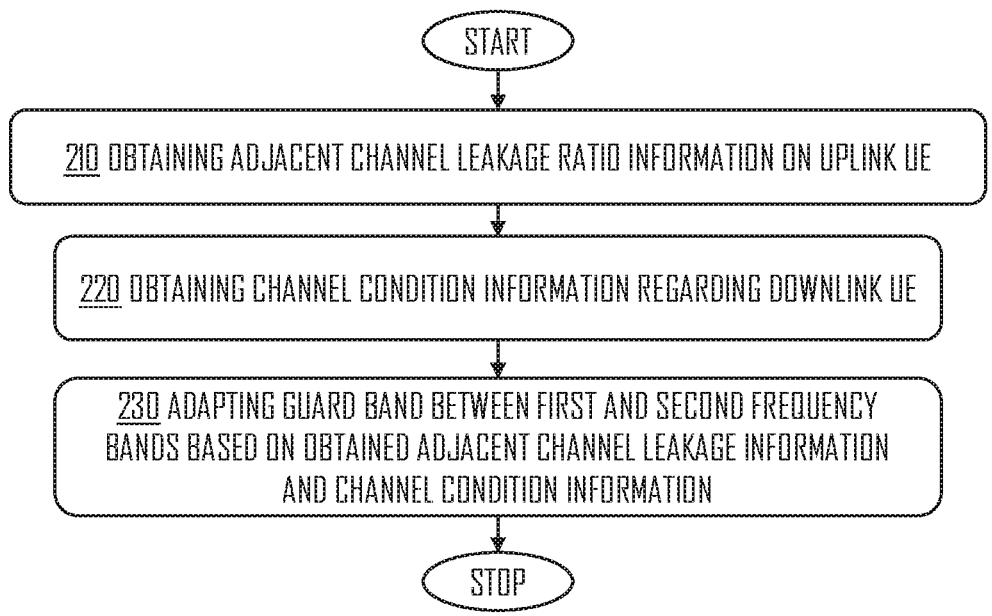
FIGS. 2 and 3 illustrate flow diagrams according to some embodiments.
Figure 3:
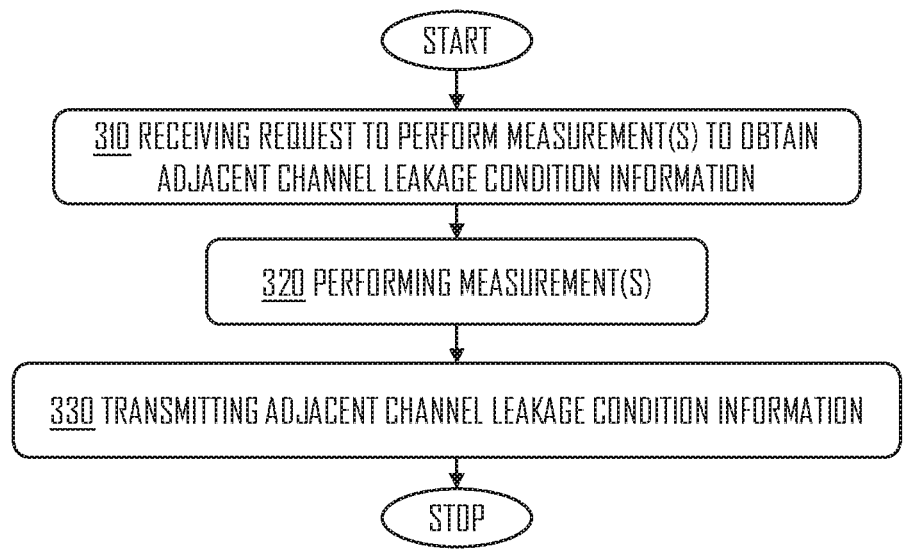

Accordingly, there is provided methods as shown in embodiments of FIGS. 2 and 3. Referring to FIG. 2, a method in a network node is provided, the method comprising: obtaining (block 210) adjacent channel leakage ratio information on the uplink UE regarding first and second adjacent frequency bands, the first frequency band configured for uplink communication between the network node and the uplink UE and the second frequency band configured for downlink communication between the network node and the downlink UE; obtaining (block 220) channel condition information regarding the downlink UE indicating channel condition associated with the first frequency band and channel condition associated with the second frequency band; and adapting (block 230) guard band between the first and second adjacent frequency bands based on the adjacent channel leakage ratio information and the channel condition information.

Referring to FIG. 3, a method in an UE is provided, the method comprising: receiving (block 310), from network node, a request to perform at least one measurement to obtain adjacent channel leakage ratio information; performing (block 320) the at least one measurement; and transmitting (block 330), to the network node, the adjacent channel leakage ratio information obtained based on the at least one measurement.

So, the proposed solution aims to flexible or dynamic adjustment of a guard band (GB) between downlink (DL)

and uplink (UL) frequency bands. The GB may thus be situated between frequency bands (sometimes referred to simply as bands or channels) utilized by co-scheduled UEs in a setting with flexible FDD duplexing for unpaired carriers.

In general, GB may be dimensioned to avoid interference between the UEs allocated neighboring, adjacent, or consecutive frequency resources (or simply adjacent frequency bands). However, in the current systems, GB may be fixed at a cell level and dimensioned in such a way to deal with worst case scenarios in terms of operating conditions, traffic coding scheme and proximity of interfering UEs. However, it may be beneficial to provide solutions, as proposed above and hereinafter, that allow adapting the GB by the network node so that the GB is not too wide. Overlarge GB may lead to inefficient use of radio resources. On the other hand, if the GB is too small, interference may cause inefficiency in the network. For example, interference may cause failed reception and therefore require retransmission(s). In general, utilizing fixed GB may result in inefficient PRB utilization, making the 1 millisecond (ms) latency requirements for TSN and/or URLLC hard to achieve and reducing the overall spectral efficiency of macro 5G networks (e.g. 3.5 gigahertz (GHz) type of deployment). Allowing flexible GB may result in improved spectrum utilization overcoming the above limitations.

Figure 4A:
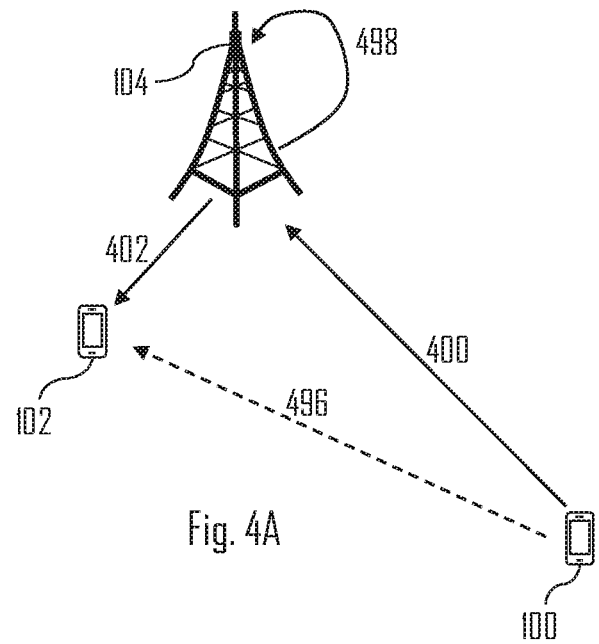
FIGS. 4A, 4B, 5, 6A, 6B, 7, 8, 9, and 12 illustrate some embodiments.
Figure 4B:
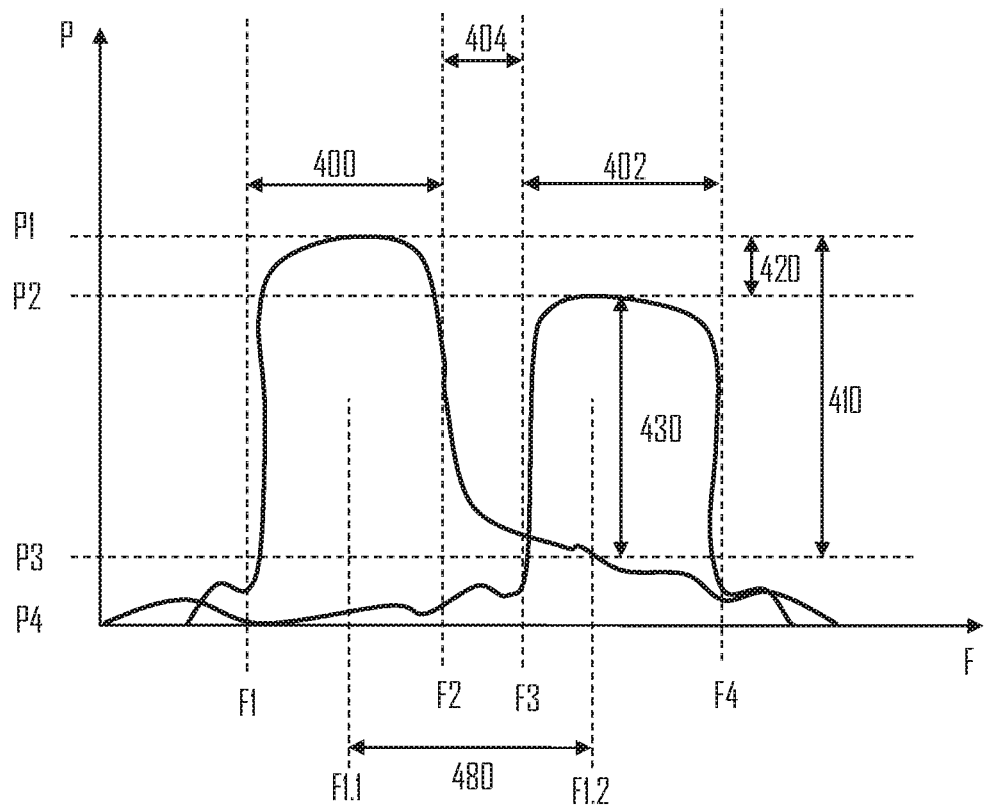

Referring to FIGS. 2 and 3, the first and second adjacent frequency bands may refer to frequency bands 400, 402 or channels that are situated next to each other (e.g. as shown in FIG. 4B). Although the bands 400, 402 may be adjacent, it is noted that the GB 404 may be situated between the bands 400, 402 as also shown in FIG. 4B.

The network node discussed with respect to FIGS. 2 and 3 may be the network node 104. Similarly, the UEs (i.e. DL and UL UEs) may refer to UEs 100, 102. For example, UL UE may refer to UE 100 and DL UE may refer to UE 102. For example, the UE performing the method of FIG. 3 may refer to the UL UE 100. The described methods of FIGS. 2 and 3 may be performed in system in which the network node 104 is communicating in UL FDD mode with UL UE 100 and in DL FDD mode with DL UE 102.

It is also noted that the first and second frequency bands may be configured e.g. by the network node 104 for UL and DL communication in the described manner.

In the proposed solution a set of methods and signaling procedures between the network node 104 and the UEs 100, 102 are utilized that enable dynamic adaption of GB 404 on a per user, per scenario basis. In some embodiment, the solution (e.g. steps of FIG. 2) may be triggered only for specific conditions: if the network is a dense network and/or if tight latency requirement(s) need to be met (e.g. as for URLLC or TSN). The proposed solution may rely on the idea that, if the network node 104 determines or knows the channel conditions (i.e. path loss and propagation delay) between the UL and DL users, it may dynamically adjust for optimum GB under these conditions.

Let us look at FIG. 4A illustrating an example scenario in which the proposed solution may be utilized. As shown in FIG. 4A, network node 104 may communicate with DL UE 102 and with UL UE 100. The communication may be simultaneous on the adjacent frequency bands 400 and 402. That is, the DL UE 102 may receive transmission(s) from the network node 104 on the second frequency band 402 and the UL UE 100 may transmit transmission(s) to network node 104 on the first frequency band 400. These DL and UL transmission may happen simultaneously or at least one simultaneous radio resources as enabled by FDD mode. It is noted that the proposed solution can be utilized in systems that utilize any kind of frequency division in which adjacent frequency bands or radio channels are utilized in DL and UL communication.

As shown in FIG. 4A, the transmission by the UL UE 100 on frequency band 400 may further cause interference to DL UE 102 due to leakage of transmission from the first frequency band 400 to the second frequency band 402. This interference is shown with arrow 496 and can be referred to as Adjacent Channel Interference (ACI) caused by the transmission, by the UL UE 100, on the band 400. The interference 496 may be experienced by the DL UE 102 that is receiving data from network node 104 at band 402. Also, interference (shown with arrow 498 e.g. ACI) may be inflicted to the network node 104. This interference 498 may be self-caused interference. That is, transmission, by the network node 104, on band 402 to DL UE 102 may leak power to band 400 on which the network node 104 may simultaneously receive transmission from the UL UE 100. In some embodiments, the network node 104 handles this interference 498 by utilizing SIC method(s). However, the interference 496 may at least be mitigated via adapting the GB 404 between the bands 400, 402 based on the ACLR information (i.e. obtained in block 210) and the channel condition information (i.e. obtained in block 220).

The interference caused by UL UE 100 to the DL UE 102 may become even greater in the case that the UL UE 100 is far-away user (e.g. at cell edge) and the DL UE 102 is close to the network node 104. Given the long distance between UL UE 100 and network node 104, the UL UE 100 may need to sustain a high UL power. If the emissions of UL UE 100 within the DL channel of DL UE 102 (as experienced by DL UE 102) are too high to be compensated by the chosen GB 404, then UL UE 100 may experience non-negligible adjacent channel interference. So, longer distance may mean higher power in transmission which may leak to the adjacent channel or channels, thus causing interference to UEs receiving on said adjacent channel or channels.

In an example embodiment, the ACLR information in block 210 is received from the UL UE 100. For example, in block 330, the UL UE 100 may transmit the ACLR information to the network node 104. The UL UE 100 may obtain the ACLR information based on the measurement(s) performed in block 320. The ACLR information may be received in response to requesting, by the network node 104, the uplink UE 100 to perform the at least one measurement to obtain the ACLR information.

In an embodiment, the network node 104 request the UL UE 100 to provide the ACLR information. For example, the UL UE 100 may have already performed the measurement before the request is received.

In an embodiment, the adjacent channel leakage ratio information received from the uplink UE comprises an information element comprising adjacent channel leakage ratio calculated by the uplink UE. However, it is possible that the ACLR information simply indicates one or more parameters (e.g. measurement result(s)) based on which the network node 104 may calculate the ACLR regarding the UL UE 100.

In an example embodiment, the ACLR information is obtained based on one or more predefined value. For example, the network node 104 may reference limits indicated in a specification (E.g. 3GPP UE ACLR specification(s)) to access the UL UE 100 ACLR performance for the active UL scenario. This may avoid the UL UE 100 ACLR signaling and measurement. That is, the ACLR information may be obtained without signaling between the network node 104 and the UL UE 100. Furthermore, the UL UE 100 measured and provided ACLR information may be more accurate than the estimation(s) provided based on the one or more predefined value (e.g. specification value(s) from a database). Therefore, if the UL UE 100 is ACLR measurement capable, it may be beneficial to request the ACLR information from the UE 100 so that the GB 404 can be scheduled as tightly as possible. However, if the UL UE 100 is not ACLR measurement capable (and also e.g. in the case that the UE is ACLR measurement capable, but signaling with the UE needs to be reduced), it is possible to obtain the ACLR information based on said one or more predefined value. It is pointed out that ACLR measurement capable may mean that the UE is capable of measuring and/or reporting ACLR. So, for example, the UL UE 100, if ACLR measurement capable, may be able to report the ACLR information to the network node 104 based on a request from the network node 104. ACLR measurement capable may sometimes be referred to herein simply as ACLR capable which in this application means that the UE is able to measure and/or report ACLR information, for example, per request.

Figure 8:
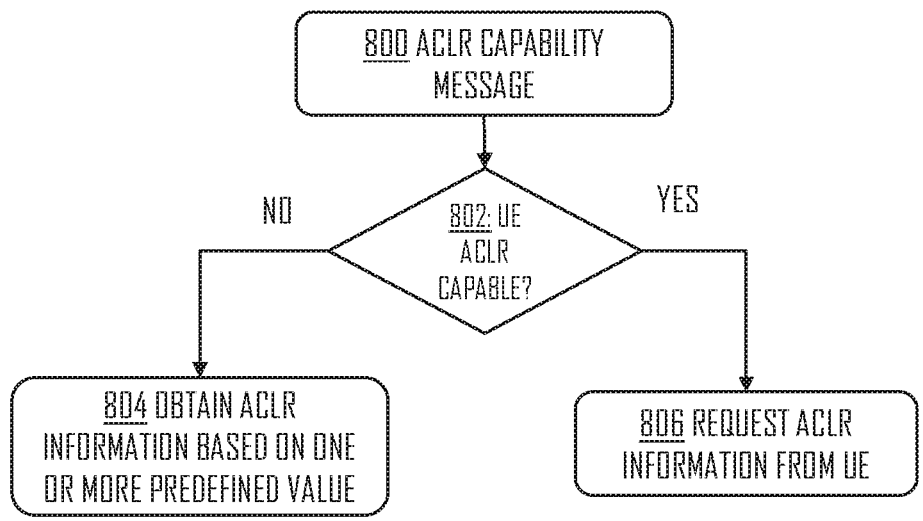

FIG. 8 illustrates an embodiment. Referring to FIG. 8, if the UL UE 100 is ACLR measurement capable (i.e. can measure and obtain ACLR information), the network node 104 may request (block 806) the UL UE 100 to provide the ACLR information as described above. However, if the UL UE 100 is not ACLR measurement capable, the network node may obtain the ACLR information from a predetermined source based on the one or more predefined values as described above.

According to an embodiment, the network node 104 determines (block 802) whether or not the UL UE 100 is ACLR measurement capable. For example, this information may be based on information on the UL UE 100 capabilities received from the UL UE 100 or from some other network entity.

In an embodiment, the UL UE 100 transmits a message (block 800) to the network node 104, wherein the message indicates whether or not the UE is ACLR measurement capable. Hence, block 802 may be performed based on e.g. information of block 800. So, in case the UL UE 100 is ACLR measurement capable, the UL UE 100 may transmit a message indicating that the UL UE 100 is capable of measuring and/or reporting ACLR information. Based on the message indicating that the UL UE 100 is ACLR measurement capable, the network node 104 may request the UL UE 100 to report the ACLR information. According to an embodiment, request of block 806 is performed in response to the reception of the message (block 800) indicating that the UL UE 100 is ACLR measurement capable.

Let us then look at FIG. 4B illustrating an embodiment. In FIG. 4B, power (P) is shown on vertical axis (or y-axis) and frequency (F) is shown on horizontal axis (or x-axis). As described above, two bands 400, 402 that are adjacent to each other are shown with the GB 404 therebetween. For example, the first band 400 may be situated between frequencies F1 and F2; the second band 402 may be situated between frequencies F3 and F4; and GB 404 between frequencies F2 and F3.

Signal power graphs of two different signals transmitted on the first and second bands 400, 402 are shown in FIG. 4B. So, for example, signal power of first signal transmitted on band 400 and signal power of second signal transmitted on band 402 may be shown. The signals may refer to reference signal (RS), Sounding RS (SRS), and/or actual user plane or control plane transmission signals, for example. Skilled person understands that the graphs may refer to transmitted or received power of said signals. In FIG. 4B we can see that maximum power of signal transmitted on the first band 400 may be P1, and that maximum power of signal transmitted on the second band 402 may be P2. Power difference 420 (can be referred to as ΔP) may thus be defined as P1-P2, and may indicate power difference between the signals transmitted on the adjacent bands 400, 402.

Reference sign 410 (i.e. between P1 and P3) may refer to ACLR of the UE (i.e. UL UE 100) transmitting the signal on the first band 400. This can be measured by the UL UE 100. So, the UL UE 100, capable of measuring ACLR, may measure, on frequency band 402, power of the signal that it itself transmits on frequency band 400. So, the UL UE 100 may measure how much of the transmitted signal (i.e. on band 400) leaks energy to the adjacent band 402 with a given GB 404. This measurement can be referred also to as measurement of total UL energy. The measurement may be performed at an offset from center frequency of the first frequency band 400 so that the measurement result may be more reliable. The total energy may thus be measured at an offset and on bandwidth relative to the active UL transmission band 400. For example, center frequency of the signal transmitted on the first frequency band 400 may be indicated with F1.1. Said offset may be indicated with reference number 480. Thus, the ACLR measurement may be performed at frequency F1.2 (or frequency area associated with frequency F1.2.

In an embodiment, F1.2 is center frequency of band 402. So, the ACLR information may indicate a value that is dependent on UL UE 100 transmission energy within band 400 and UL UE transmission energy within band 402, thus describing a leakage ratio of the signal transmitted by the UL UE 100 at band 400. The described measurement may be performed as instructed by the network node 104, and thus it is possible that the measurement details (e.g. offset 480) are indicated in the ACLR request message (e.g. block 806).

Reference sign 430 may refer to Adjacent Channel Interference Ratio (ACIR). ACIR may be defined as a value between P2 and P3. That is P2 may be power of the signal transmitted on band 402 and P3 may be the inference (e.g. ACI) at band 402 (e.g. at an offset 480 from F1.1) caused by the leaked power from the signal transmitted on band 400.

Figure 5:
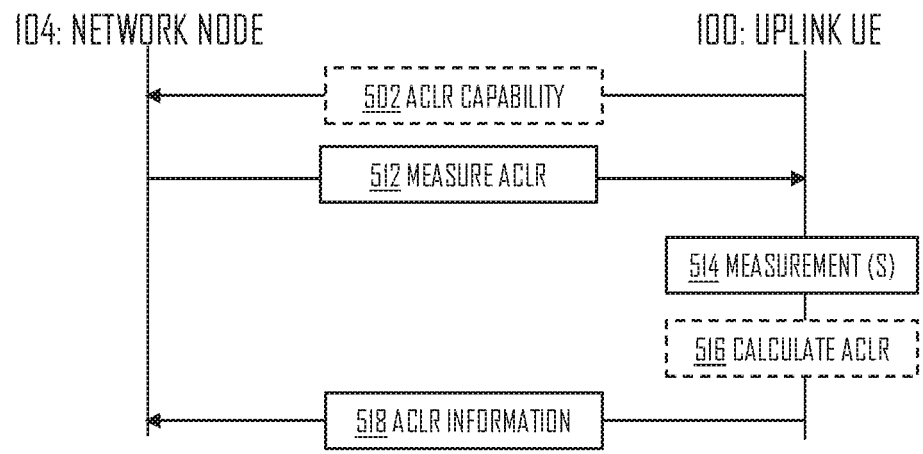

FIG. 5 illustrates an embodiment in which the ACLR information obtaining from the UL UE 100 is explained. Referring to FIG. 5, the network node 104 may request (block 512) the uplink UE 100 to perform at least one measurement to obtain the adjacent channel leakage ratio information. The UL UE 100 may perform the measurement(s), for example, as described above in block 514. In block 518, the ACLR information may be transmitted by the UL UE 100 to the network node 104. Therefore, the network node 104 may receive the ACLR information in response to the requesting in block 512. The process described in FIG. 5 may be understood as further details to the process described with respect to block 806 of FIG. 8.

The purpose of message of block 512 may be to request the ACLR information and additionally indicate, to the UL UE 100, that the UL UE 100 actions (i.e. UL transmission) may have an effect on other users (i.e. mainly DL UE 102).

According to an embodiment, with reference to FIG. 5, the uplink UE 100 calculates (block 516) adjacent channel leakage ratio based on the at least one measurement (block 514), wherein the adjacent channel leakage ratio information (i.e. transmitted e.g. in block 518) comprises an information element comprising the adjacent channel leakage ratio. That is, the information element may explicitly indicate the calculated ACLR.

In an embodiment, in block 502, the UL UE 100 transmits a message to the network node, wherein the message indicates that the UL UE 100 is capable of reporting adjacent channel leakage information. Hence, the network node 104 may request the ACLR information in block 512. For example, the capability information of block 502 may be transmitted by the UE 100 to the network when the UE connects to the network, and thus it is not necessarily transmitted to the network node 104 (as is shown in FIG. 5). If the capability information is transmitted to some other network element, the network node may obtain the information from the network, for example. For example, an UE may transmit such capability information to the network (e.g. to the network node 104) during network attachment. ACLR measurement capability may be used, by the UE, for digital pre-distortion (DPD) and verification purposes in addition or as an alternative to the currently discussed purpose.

Figure 6A:
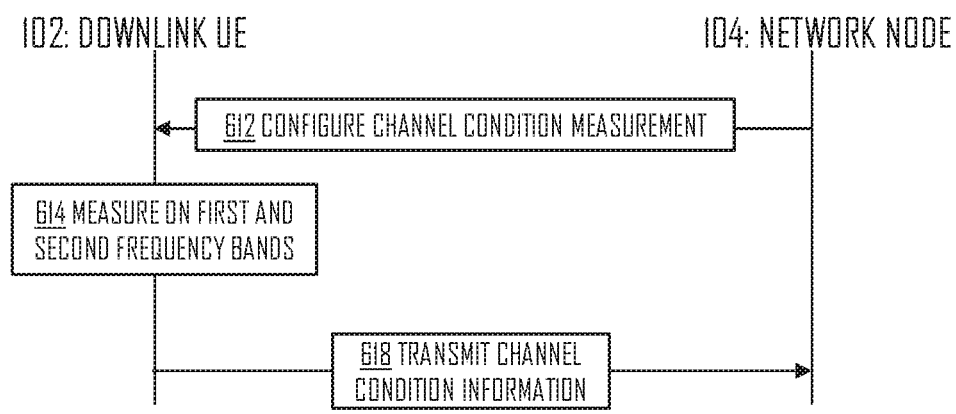
Figure 6B:
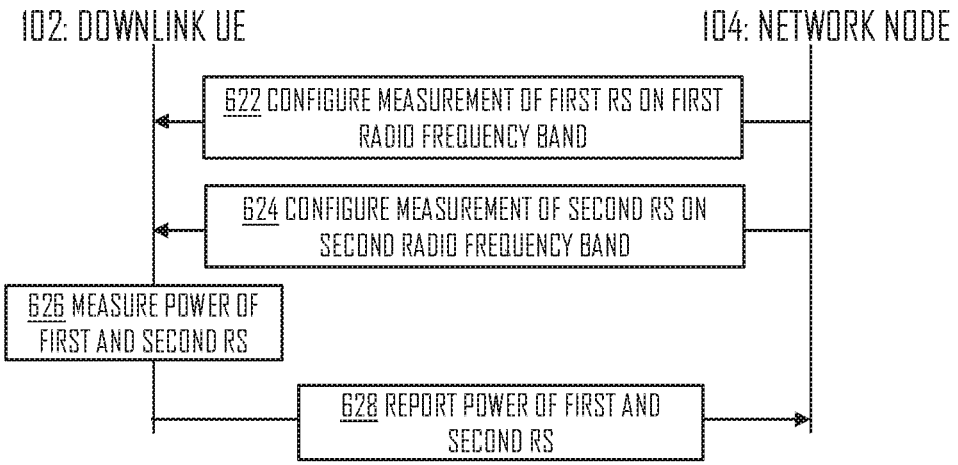

FIGS. 6A and 6B illustrate some embodiments related to the obtaining the channel condition information on the first and second frequency bands 400, 402 from the DL UE 102. Referring first to FIG. 6A, in block 612, the network node 104 may configure the DL UE 102 to measure the channel condition associated with the first frequency band 400 and the channel condition associated with the second frequency band 402. That is, the DL UE 102 may perform measurement on the first frequency band 400 and on the second frequency band 402. For example, the DL UE 102 may measure RSs transmitted on the bands 400, 402 respectively.

The DL UE 102 may perform the measurements as shown in block 614, and transmit (block 618), based on the measurements, the channel condition information indicating channel condition associated with the first frequency band 400 and channel condition associated with the second frequency band 402. The network node 104 may receive the transmitted channel condition information.

Referring now to FIG. 6B, the configuring (e.g. of block 612) may comprise configuring (block 622) the downlink UE 102 to measure, at the first frequency band 400, received signal power of a first RS transmitted on the first frequency band 400.

The configuring (e.g. of block 612) may further comprise configuring (block 624) the downlink UE 102 to measure, at the second frequency band 402, received signal power of a second RS transmitted on the second frequency band 402.

The DL UE 102 may measure (block 626) on the first band 400 the first RS and measure on the second band 402 the second RS. The measurement may not necessarily be simultaneous, and may thus happen at different time instants or periods. For example, the DL UE 102 may configured to measure on first band 400 at certain time period and on the second band 402 at some other time period. This may also mean that the RSs are transmitted at those different time instants.

In block 628, the DL UE 102 may report the measured power of the first RS and measured power of the second RS to the network node 104. Hence, the channel condition information may indicate the received signal power of the first RS and the received signal power of the second reference signal and/or a power difference between the received signal power of the first reference signal and the received signal power of the second reference signals. Let us take another look at FIG. 4B. As was described, the power difference may be indicated with reference sign 420 and may be situated between P1 and P2. It is good to notice that now the indicated and/or calculated power difference 420 is power difference at the receiver side. Naturally, at the transmitter side similar power difference may be observed, but due to e.g. path loss the difference may be of different quantity. So, using FIG. 4A as an example, the report in block 628 may indicate difference 420 and/or P1 and P2. If difference 420 is indicated, the network node 104 may at least in some embodiments, directly utilize said difference 420 in adapting the GB 404. However, if P1 and P2 are indicated (and not the difference 420), the network node 104 may calculate difference 420 based on P1 and P2. So, the report of block 628 may indicate the difference between measured energy on frequency band 400 and on frequency band 402, wherein the measurement is performed by the DL UE 102.

In an embodiment, the network node 102 configures the uplink UE 100 to transmit the first reference signal on the first frequency band 400. The DL UE 102 may be configured (e.g. in block 622) to measure the first RS transmitted by the UL UE 100 on the first frequency band 400. For example, in an example embodiment of FIG. 7, in block 722, the network node 104 may configure the UL UE 100 to transmit the first RS. First RS transmission by the UL UE 100 is shown with block 726. In block 728, the DL UE 102 may measure the first RS.

In an embodiment, the network node 102 transmits the second reference signal on the second frequency band 402. The DL UE 102 may be configured (e.g. in block 624) to measure the second RS transmitted by the network node 104 on the second frequency band 402. For example, in an example embodiment of FIG. 7, in block 702, 704, the network node 104 may transmit the second RS. In block 706, the DL UE 102 may measure the second RS. It is also noted that the second RS transmitted by the network node 104 may be transmitted to the UL UE 100, and the UL UE 100 may measure said second RS accordingly.

Figure 7:
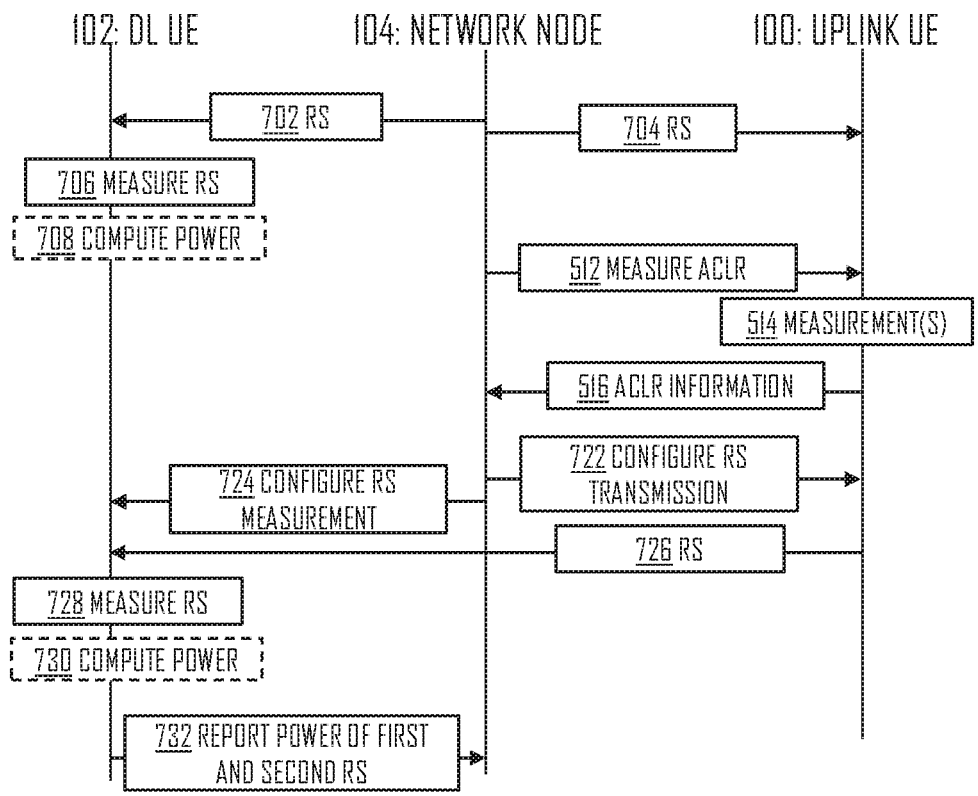

In an example embodiment of FIG. 7, in block 708, 730, the DL UE may compute or determine the power of the measured (block 708, 730) RS signal. This step may be optional in the sense that said determination may be included in step 706, 728.

In an embodiment, in block 732, the DL UE 102 reports the measured power of the first and second RS to the network node 104. That is, in block 732, the channel condition information may be transmitted to the network node 104, wherein the channel condition information comprises the measured power or energy level of the first and second RS.

The DL UE 102 may measure Reference Signal Received Power (RSRP) of the first and second RS, wherein the channel condition information comprises RSRP of the first and second RSs.

According to an aspect, FIG. 7 may be seen as depicting overview of interactions between the network node 104 and the UEs 100, 102. It is noted that some features, e.g. blocks 512-516, were discussed previously with respect to FIG. 5, and this discussion is not repeated.

According to an embodiment, with reference to FIG. 7, the network node 104 transmits RS (block 702, 704) before it configures the UL UE 100 to transmit RS (block 722). Further, the RS transmission of block 702, 704 may be performed before acquiring the ACLR information, for example. For example, the ACLR information acquiring (e.g. steps 512-516 or obtaining the ACLR based on specification value(s)) may be performed before configuring the UL UE 100 to transmit the RS signal.

In an embodiment, the network node 104 configures the DL UE 102 to report the power of the first and second RS signals. For example, this may be performed in block 724 when the DL UE 102 is configured to measure the first RS transmitted by the UL UE 100.

Figure 9:
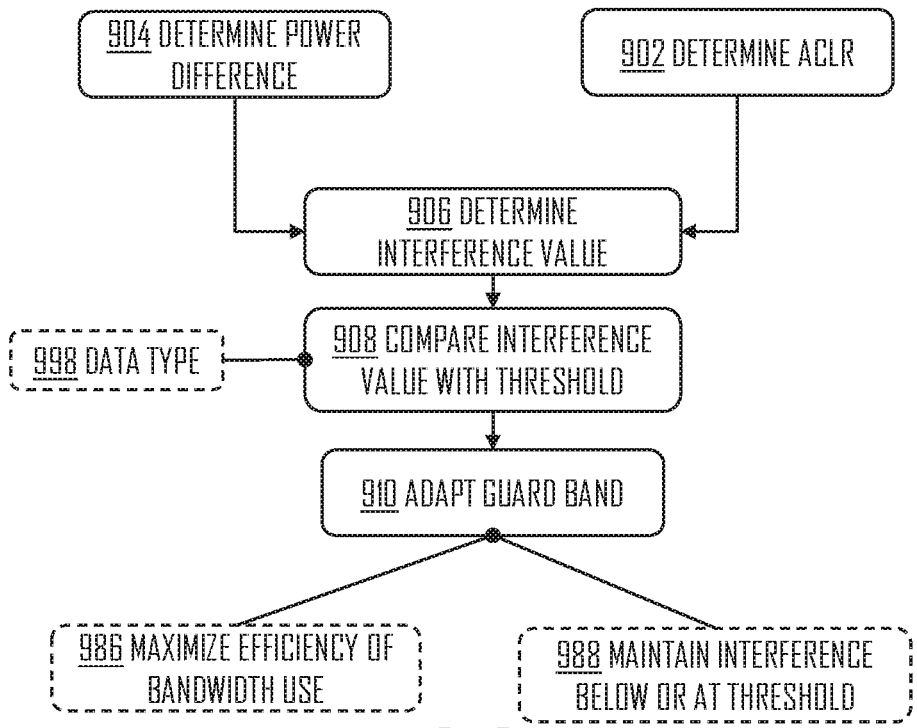

FIG. 9 illustrates an embodiment. Referring to FIG. 9, the network node 104 may determine (block 902) adjacent channel leakage ratio based on the obtained adjacent channel leakage ratio information (e.g. obtained in block 210 or 518); determine (block 904), based at least on the channel condition information (e.g. obtained in block 220 or 618), one or more power value indicative of a difference (e.g. difference 420) between a received signal power P1 associated with the first frequency band 400 and a received signal power P2 associated with the second frequency band 402; determine (block 906), based on the adjacent channel leakage ratio and the power difference value, interference value associated with the downlink UE 102; and adapt (block 910) the guard band 404 based on comparison (block 908) of the determined interference value and a predetermined threshold.

The predetermined threshold may be dependent on an acceptable level of ACI for the DL UE 102. Dependent may comprise cases where determined interference value is ACI and is compared against acceptable level of ACL and/or cases where the interference value is something else, such as ACIR, and is compared against corresponding threshold, such as ACIR threshold. The skilled person understands that the comparison of block 908 may be done to determine suitable GB 404 which enables the DL and UL communication in bands 400, 402 to be efficient. Efficiency may refer to maximizing (block 986) bandwidth use while maintaining (block 988) interference below or at the acceptable level of interference. Interference may refer to ACI. So, the GB 404 may, at least in some examples, be reduced as much as possible without causing ACI exceeding a threshold. This may enable more bandwidth to be allocated to the bands 400, 402, or some other bands.

Acceptable level of ACI may depend on one or more criterion. In one example embodiment, the acceptable level of ACI for the DL UE 102 (e.g. leaked signal from UL band 400 to DL band 402) depends at least on type (block 998) of data or traffic in the downlink communication between the network node 104 and the downlink UE 102. For example, the network node 104 may allow lower Signal to Interference-plus-Noise Ratio (SINR) (or simply Signal to Interference Ratio (SIR), where the interference may be ACI) for first data type than for a second data type being different to the first data type. Hence, for the first data type, the lower SINR (or SIR) may enable adapting the GB 404 to be smaller than for the second data type. Additionally, for example, the network node 104 may use a more robust Modulation Coding Scheme (MCS) for the first data type than for the second data type.

According to an embodiment, the adapting (block 230 or 910) the guard band 404 is performed according to the following rules: maximize efficiency of bandwidth use (block 986), and maintain determined adjacent channel interference below or at the acceptable level of adjacent channel interference (block 988).

As discussed above, the one or more power value may comprise P1 and P2 as measured by the DL UE 102 and/or the actual difference 420 indicating value, such as $\Delta P$. As a reminder, in this case P1 may indicate power or energy of a signal (e.g. SRS transmitted by the UL UE 100) transmitted on the first band 400 as measured by the DL UE 102 and P2 may indicate power or energy of a signal (e.g. RS transmitted by the network node 104) transmitted on the second band 402 as measured by the DL UE 102. In some examples, the P1 and P2 or $\Delta P$ (i.e. information obtained from the DL UE 100) may be sufficient for adapting the GB 404 (in addition ACLR information may be used as described). This may be the case, for example, if the reference signal(s) are transmitted with same power as the actual data transmission. For example, the first RS may be transmitted, by the UL UE 100, using same (or at least substantially the same) power as actual UL data transmitted by the UL UE 100.

Figure 12:
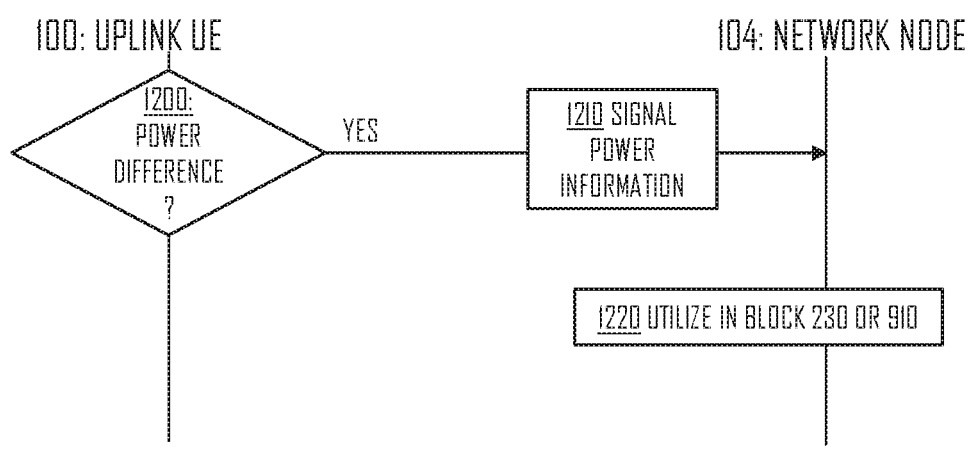

FIG. 12 illustrates an embodiment regarding the indication of the power offset or difference value from the UL UE 100 to the network node 104. Referring to FIG. 12, in block 1210, the UL UE 100 may transmit, to the network node 104, signal power information indicating a power difference (indicated as $\delta_p$ below) between a transmission power of an uplink data transmission signal and a transmission power of the first reference signal. The first reference signal may be the RS transmitted e.g. in block 726. The uplink data transmission signal may refer to a signal(s) which is used to transmit or carry the user plane and/or control plane data. I.e. signal that is used in the actual UL communication.

The network node 104 may receive the signal power information (block 1210), and take the signal power information into account in adapting the GB 404 as indicated in block 1220. This may mean that the power difference 420 (which is utilized in the GB adaptation process) may be computed with greater accuracy in cases where the transmission power of the RS is different to the power of the uplink data transmission signal. So, basically the $\Delta P$ value may indicate difference in power of RS signals, but may not take into account the possible further difference in cases where first RS is transmitted with different power than the actual data transmission signal. However, as explained, the method may be made even more accurate by indicating, by the UL UE 100, this power difference between the transmitted UL data signal and first RS.

In an embodiment, the UL UE 100 transmits the signal power information if there is a power difference between the transmission power of an uplink data transmission signal and a transmission power of the first reference signal (block 1200). So, if there is no difference, the signal power information may not be indicated. However, even without the difference, in some embodiments, the signal power information may be transmitted. In these cases, the information would indicate null difference.

The signal power information may explicitly indicate transmission power of the signals and/or difference between the signals.

However, if transmission power of the first RS and/or second RS is different than the actual data transmission(s) (e.g. the first RS is transmitted, by the UL UE 100, using different power than the actual UL data transmitted by the UL UE 100), it may be beneficial to use this power offset or difference in adapting the GB 404. For example, the RS signal power P1, both at the transmitter and receiver, may be different than the power of the actual aggressor signal. Therefore, power offset or difference may indicate difference between P1 and the actual UL data transmission power. Based on the offset or difference, $\Delta P$ may be calculated with increased accuracy.

It is noted that it may be beneficial to determine power offset at the transmitter so that e.g. path loss may not affect the difference. Therefore, the network node 104 may take into account the first RS (e.g. SRS) transmission power and UL UE 100 data transmission power offset or difference when adapting the GB 404. Said power offset or difference may be indicated by the UL UE 100 to the network node 104 or the network node 104 may determine the offset or difference in some other way. For example, the network node 104 may configure the UL UE 100 to transmit the first RS and/or data with certain power, and hence it may determine the difference (if there is any) between the RS power and data transmission power.

In an embodiment, the UL UE 100 transmits the RS (block 726) with a preset power. The preset power may be also known by the network node 104.

In an embodiment, the UL UE 100 transmits the RS (block 726) with a power configured by the network node 104.

The network node 104 may further set the GB 404 to a certain default value before transmitting the RS (block 702, 704) and/or configuring the RS transmission (block 726) by the UL UE 100. Thus, when the RSs are measured, the GB 404 may be set to the default value. The default value may be subsequently be adapted to e.g. smaller value based at least on the channel condition information and the ACLR information.

An example of how to implement the GB 404 adaptation (e.g. block 230 or 910) is given below.

The network node 104 may use P1 (as indicated by the DL UE 100) and ACLR (as indicated by the UL UE 100) centered at $f_K$, $f_{K+1}$, where $f_K$ may be center frequency (also noted as F1.1 above) of the band 400 and $f_{K+1}$ may be center frequency of the band 402. The network node 104 may perform a logarithmic fit (alternatively, a raised-cosine filter can be used) to model the leakage over the frequency range f of the DL UE 102, where $$f \in \left[ f_{K+1} - \frac{BW_{F3F4}}{2}, f_{K+1} + \frac{BW_{F3F4}}{2} \right],$$

wherein $BW_{F3F4}$ denotes the bandwidth of band 402, i.e. bandwidth between F3 and F4 as shown in FIG. 4B. The model may be called $L_b(f)$.

The network node 104 may further shift the fit obtained from the logarithmic model by a power offset or difference $\delta_p$ between the uplink data transmission signal and the first RS (see e.g. blocks 1200, 1210, and 1220, in which the network node 104 may be indicated the power offset by the UL UE 100):

$$L_b(f) := L_b(f) + \delta_p.$$

Further, the SINR, as experienced by the DL UE 102, may be modelled over DL UE's 102 frequency range (i.e. over band 402) using the shifted $L_b(f)$ and the reported power P2 (as indicated by the DL UE 100):

$$SINR(f) = P2 - L_b(f).$$

The network node may now have a model of the SINR over the DL UE's 102 frequency (i.e. over band 402) and may choose the GB 404 to allow for a variable SINR level. Depending on the traffic type needs of the DL UE 102, network node 104 may, for example, allow a lower SINR, and thus minimize GB, but choose a more robust MCS instead, or require higher SINR, thus increasing GB, to name a couple of examples.

The GB adapting (e.g. block 230 or 910) may be an iterative process if only information of UL UE 100 energy within the frequency band 402 is available. However, if the network node 104 has additional information about the UL UE 100 leakage energy outside the frequency band 402, the adaptation may be performed in one go, i.e. without iterative adaptation. It is noted that iteratively adapting the GB 404 may always be possible in order to ensure efficient use of radio resources.

For example, UL UE 100 may be requested by the network node 104 to measure and report ACLR within a certain frequency range or at certain frequency within the band 402 (e.g. at an offset 480). For example, the measurement may be performed at F1.2 or frequency range around F1.2. For example, F1.2 may be situated between F3 (lower boundary of band 402) and center frequency of the signal transmitted on band 402. So, in this example, one leakage power value is indicated to the network node 104, and thus network node 104 may have no information about UL UE 100 leakage power for other GB 404 settings (i.e. different widths or sizes of GB 404), and thus the process for optimizing the GB 404 may need to be iterative. So, if only one value is requested, iterative process may be beneficial.

However, if more than one leakage power value is requested, the adapting process may be performed with greater accuracy in one go. So, in addition to the above request, the UL UE 100 may be requested to perform one or more additional ACLR measurements. The one or more additional measurements may be performed within and/or outside the band 402. This is because with different GB 404 settings, the bands 400, 402 may also be situated differently. For example, in FIG. 4B we can see that the signal transmitted on band 400 leaks also to frequency area that is above F4 (i.e. higher boundary of band 402). So, essentially, the network node 104 may request the UL UE 100 to perform ACLR measurement(s) with one or more GB 404 settings meaning that with different GB 404 settings the UL UE 100 may measure the ACLR at different offsets from its center frequency F1.1. In such case, the request (e.g. block 512) may indicate relevant details of the different measurements. For example, the request message may indicate the different offsets from the center frequency F1.1.

So, the network node 104 may request UL UE 100 to measure and report ACLR at a given offset frequency (e.g. F1.2 which is offset 480 from F1.1) within a given bandwidth (e.g. some indicated bandwidth) or request multiple measurements at varying offsets (e.g. higher and lower) which may enable the network node 105 to accurately model the DL UE 104 experienced interference with respect to the GB setting(s).

One advantage of the proposed solution may be that network node 104 may optimize the PRB utilization to cope with network densification, or stringent latency requirements on a per co-scheduled users basis. Additionally, the method may be switched on/off according to the stringency of the scenario, and the network node may fall back to the traditional fixed GB approach.

Figure 10:
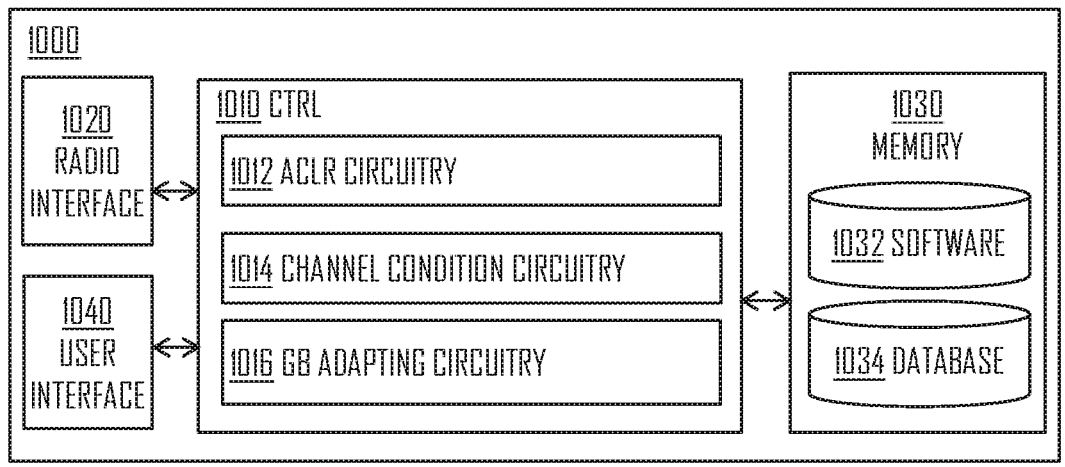
FIGS. 10 and 11 illustrate block diagrams according to some embodiments.
Figure 11:
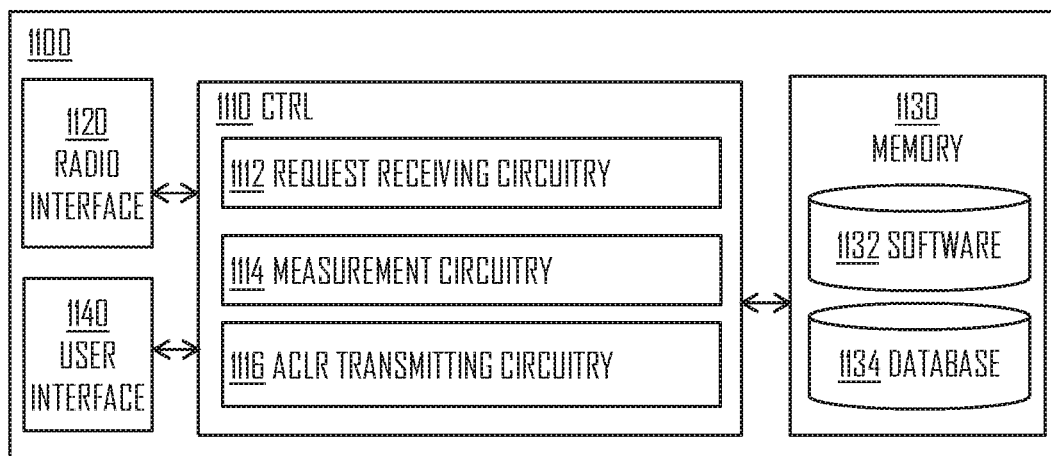

FIGS. 10 and 11 provide apparatuses 1000, 1100 comprising a control circuitry (CTRL) 1010, 1110, such as at least one processor, and at least one memory 1030, 1130 including a computer program code (software) 1032, 1132, wherein the at least one memory and the computer program code (software) 1032, 1132, are configured, with the at least one processor, to cause the respective apparatus 1000, 1100 to carry out any one of the embodiments of FIGS. 1 to 9 and 12, or operations thereof.

Referring to FIGS. 10 and 11, the memory 1030, 1130 may be implemented using any suitable data storage technology, such as semiconductor based memory devices, flash memory, magnetic memory devices and systems, optical memory devices and systems, fixed memory and removable memory. The memory 1030, 1130 may comprise a database 1034, 1134 for storing data.

The apparatus 1000, 1100 may further comprise radio interface (TRX) 1020, 1120 comprising hardware and/or software for realizing communication connectivity according to one or more communication protocols discussed above. The TRX may provide the apparatus with communication capabilities to access the radio access network, for example. The TRX may comprise standard well-known components such as an amplifier, filter, frequency-converter, (de)modulator, and encoder/decoder circuitries and one or more antennas. For example, the TRX may enable UL communication between the UL UE 100 and network node 104, and DL communication between the DL UE 102 and the network node 104.

The apparatus 1000, 1100 may comprise user interface 1040, 1140 comprising, for example, at least one keypad, a microphone, a touch display, a display, a speaker, etc. The user interface 1040, 1140 may be used to control the respective apparatus by a user of the apparatus.

In an embodiment, the apparatus 1000 is or is comprised in a network node (also called a network element, a base station, an access node, or a gNB, for example). The apparatus 1000 may be the network element 104, such as a gNB, for example.

According to an embodiment, with reference to FIG. 10, the control circuitry 1010 comprises an ACLR circuitry 1012 configured to cause the apparatus 1000 to perform at least operations of block 210; a channel condition circuitry 1014 configured to cause the apparatus 1000 to perform at least operations of block 220; and a GB adapting circuitry 1016 configured to cause the apparatus 1000 to perform at least operations of block 230.

In an embodiment, the apparatus 1100 is or is comprised in a UE (also referred to as terminal device or user device, such as mobile phone, smart phone or other portable electronic device). The apparatus 1100 may be or be comprised in the UL UE 100.

According to an embodiment, with reference to FIG. 11, the control circuitry 1110 comprises a request receiving circuitry 1112 configured to cause the apparatus 1100 to perform at least operations of block 310; a measurement circuitry 1114 configured to cause the apparatus 1100 to perform at least operations of block 320; and an ACLR transmitting circuitry 1016 configured to cause the apparatus 1100 to perform at least operations of block 330.

In an embodiment, at least some of the functionalities of the apparatus 1000 may be shared between two physically separate devices, forming one operational entity. Therefore, the apparatus 1000 may be seen to depict the operational entity comprising one or more physically separate devices for executing at least some of the described processes. Thus, the apparatus 1000 utilizing such shared architecture, may comprise a remote control unit (RCU), such as a host computer or a server computer, operatively coupled (e.g. via a wireless or wired network) to a remote radio head (RRH) located in the base station or network element. In an embodiment, at least some of the described processes may be performed by the RCU. In an embodiment, the execution of at least some of the described processes may be shared among the RRH and the RCU.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

When reference is made to UL UE (e.g. UL UE 100) it needs to be understood that such reference does not mean that the UL UE is only capable of uplink communication. In fact, such UL UE may be capable of bidirectional communication (i.e. including both UL and DL communication) as known by a skilled person. Hence, UL UE may also be referred to as first UE or simply UE (e.g. UE 100). Similarly, when reference is made to DL UE (e.g. DL UE 102) it needs to be understood that such reference does not mean that the DL UE is only capable of downlink communication. In fact, such DL UE may be capable of bidirectional communication (i.e. including both UL and DL communication) as known by a skilled person. Hence, DL UE may be referred to as second UE or simply UE (e.g. UE 102).

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 9, and 12 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 9, and 12 or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 9, and 12, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 9, and 12 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a transitory or non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
    at least one processor, and
    at least one memory comprising a computer program code, wherein the at least one memory and the computer program code are configured, with the at least one processor, to cause the apparatus at least to:
    obtain adjacent channel leakage ratio information on an uplink user equipment, UE, regarding first and second adjacent frequency bands, wherein the apparatus is configured to communicate in frequency-division duplexing, FDD, mode with a plurality of UE comprising the uplink UE and a downlink UE, the first frequency band configured for uplink communication between the apparatus and the uplink UE and the second frequency band configured for downlink communication between the apparatus and the downlink UE;
    obtain channel condition information indicating channel condition associated with the first frequency band and channel condition associated with the second frequency band; and
    adapt a guard band between the first and second adjacent frequency bands based on the adjacent channel leakage ratio information and the channel condition information.

2. The apparatus of claim 1, wherein the at least one memory and the computer program code are configured, with the at least one processor, to further cause the apparatus at least to:
    request the uplink UE to perform at least one measurement to obtain the adjacent channel leakage ratio information; and
    receive, from the uplink UE, the adjacent channel leakage ratio information in response to the requesting.

3. The apparatus of claim 1, wherein the at least one memory and the computer program code are configured, with the at least one processor, to further cause the apparatus at least to:
    receive a message from the uplink UE, wherein the message indicates that the uplink UE is capable of reporting adjacent channel leakage information.

4. The apparatus of claim 1, wherein the adjacent leakage ratio information is obtained based on one or more predefined values.

5. The apparatus of claim 1, wherein the at least one memory and the computer program code are configured, with the at least one processor, to further cause the apparatus at least to:
    configure the downlink UE to measure the channel condition associated with the first frequency band and the channel condition associated with the second frequency band; and
    receive, from the downlink UE, the channel condition information indicating channel condition associated with the first frequency band and channel condition associated with the second frequency band.

6. The apparatus of claim 5, wherein the at least one memory and the computer program code are configured, with the at least one processor, to further cause the apparatus at least to:
    configure the downlink UE to measure, at the first frequency band, received signal power of a first reference signal transmitted on the first frequency band; and
    configure the downlink UE to measure, at the second frequency band, received signal power of a second reference signal transmitted on the second frequency band, wherein the channel condition information, received from the downlink UE, indicates the received signal powers of the first and second reference signals and/or a power difference between the received signal powers of the first and second reference signals.

7. The apparatus of claim 6, wherein the at least one memory and the computer program code are configured, with the at least one processor, to further cause the apparatus at least to:
configure the uplink UE to transmit the first reference signal on the first frequency band.

8. The apparatus of claim 6, wherein the at least one memory and the computer program code are configured, with the at least one processor, to further cause the apparatus at least to:
transmit the second reference signal on the second frequency band.

9. The apparatus of claim 1, wherein the at least one memory and the computer program code are configured, with the at least one processor, to further cause the apparatus at least to:
determine adjacent channel leakage ratio based on the obtained adjacent channel leakage ratio information;
determine, based at least on the channel condition information, one or more power values indicative of a difference between a received signal power associated with the first frequency band and a received signal power associated with the second frequency band;
determine, based on the adjacent channel leakage ratio and the power difference value, interference value associated with the downlink UE; and
adapt the guard band based on comparison of the determined interference value and a predetermined threshold.

10. The apparatus of claim 9, wherein the predetermined threshold is dependent on an acceptable level of adjacent channel interference for the downlink UE.

11. The apparatus of claim 10, wherein the acceptable level of adjacent channel interference for the downlink UE depends at least on type of data in the downlink communication between the apparatus and the downlink UE.

12. The apparatus of claim 9, wherein the at least one memory and the computer program code are configured, with the at least one processor, to further cause the apparatus at least to:
receive, from the uplink UE, signal power information indicating a power difference between a transmission power of an uplink data transmission signal and a transmission power of a first reference signal transmitted by the uplink UE on the first frequency band; and
determine the one or more power values taking into account the signal power information.

13. An apparatus comprising:
at least one processor, and
at least one memory comprising a computer program code, wherein the at least one memory and the computer program code are configured, with the at least one processor, to cause the apparatus at least to:
receive, from a network node of a cellular communication network, a request to perform at least one measurement to obtain adjacent channel leakage ratio information, wherein the apparatus is configured to communicate in frequency-division duplexing, FDD, mode in uplink with the network node;
perform the at least one measurement; and
transmit, to the network node, adjacent channel leakage ratio information obtained based on the at least one measurement.

14. The apparatus of claim 13, wherein the at least one memory and the computer program code are configured, with the at least one processor, to further cause the apparatus at least to:
utilize a first frequency band in communication with the network node, wherein the network node is configured to utilize the adjacent channel leakage ratio information in adapting a guard band between the first frequency band and a second frequency band configured to be used by a user equipment in FDD downlink communication with the network node, the first and second frequency bands being adjacent frequency bands.

15. The apparatus of claim 13, wherein the performing the at least one measurement comprises measuring channel condition at a certain offset from a center frequency of the first frequency band.

16. The apparatus of claim 15, wherein the request indicates the certain offset.

17. The apparatus of claim 13, wherein the at least one memory and the computer program code are configured, with the at least one processor, to further cause the apparatus at least to:
transmit a message to the network node, wherein the message indicates that the apparatus is capable of reporting adjacent channel leakage information.

18. The apparatus of claim 13, wherein the at least one memory and the computer program code are configured, with the at least one processor, to further cause the apparatus at least to:
receive, from the network node, a request to transmit a first reference signal on a first frequency band; and
transmit the first reference signal.

19. The apparatus of claim 18, wherein the at least one memory and the computer program code are configured, with the at least one processor, to further cause the apparatus at least to:
transmit, to the network node, signal power information indicating a power difference between a transmission power of an uplink data transmission signal and a transmission power of the first reference signal.

20. A method comprising:
receiving at an apparatus, from a network node of a cellular communication network, a request to perform at least one measurement to obtain adjacent channel leakage ratio information, wherein the apparatus is configured to communicate in frequency-division duplexing mode in uplink with the network node;
performing the at least one measurement; and
transmitting, to the network node, adjacent channel leakage ratio information obtained based on the at least one measurement.

* * * * *